(12) United States Patent
Hayakawa et al.

(10) Patent No.: US 8,747,937 B2
(45) Date of Patent: Jun. 10, 2014

(54) CONCENTRATED COFFEE EXTRACT

(75) Inventors: Yoshinobu Hayakawa, Sumida-ku (JP); Sayaka Domon, Sumida-ku (JP); Yoshikazu Ogura, Sumida-ku (JP)

(73) Assignee: Kao Corporation, Tokyo (JP)

( * ) Notice: Subject to any disclaimer, the term of this patent is extended or adjusted under 35 U.S.C. 154(b) by 244 days.

(21) Appl. No.: 13/318,013

(22) PCT Filed: Apr. 21, 2010

(86) PCT No.: PCT/JP2010/002869
§ 371 (c)(1), (2), (4) Date: Jan. 11, 2012

(87) PCT Pub. No.: WO2010/125770
PCT Pub. Date: Nov. 4, 2010

(65) Prior Publication Data
US 2012/0107482 A1 May 3, 2012

(30) Foreign Application Priority Data

Apr. 28, 2009 (JP) ................................ 2009-109211
Dec. 18, 2009 (JP) ................................ 2009-288155

(51) Int. Cl.
A23F 5/24 (2006.01)
(52) U.S. Cl.
USPC ............ 426/594; 426/534; 426/590; 426/650
(58) Field of Classification Search
USPC .................................. 426/594, 534, 590, 650
See application file for complete search history.

(56) References Cited

U.S. PATENT DOCUMENTS

| | | | |
|---|---|---|---|
| 3,702,253 A * | 11/1972 | Winter et al. ................. | 426/537 |
| 4,857,351 A * | 8/1989 | Neilson et al. ............... | 426/533 |
| 4,904,484 A * | 2/1990 | Small et al. .................. | 426/45 |
| 4,985,271 A * | 1/1991 | Neilson et al. ............... | 426/595 |
| 5,322,703 A | 6/1994 | Jensen et al. | |
| 5,328,708 A * | 7/1994 | Rizzi et al. ................... | 426/388 |
| 5,417,993 A | 5/1995 | Takano et al. | |
| 6,296,889 B1 * | 10/2001 | Ott et al. ...................... | 426/534 |
| 7,316,826 B2 * | 1/2008 | Kindel et al. ................. | 426/534 |
| 7,470,443 B2 * | 12/2008 | Ceriali et al. ................ | 426/387 |
| 8,053,012 B2 * | 11/2011 | Navarini et al. ............. | 426/433 |
| 8,394,442 B2 * | 3/2013 | Reiss et al. .................. | 426/534 |
| 2007/0116850 A1 | 5/2007 | Fujii et al. | |
| 2007/0128326 A1 * | 6/2007 | Milo et al. .................... | 426/594 |
| 2007/0160726 A1 | 7/2007 | Fujii et al. | |
| 2009/0029023 A1 * | 1/2009 | Kerler et al. ................. | 426/535 |
| 2010/0323082 A1 | 12/2010 | Shigeno et al. | |
| 2012/0070552 A1 * | 3/2012 | Navarini et al. ............. | 426/433 |

FOREIGN PATENT DOCUMENTS

| | | |
|---|---|---|
| CN | 1034657 A | 8/1989 |
| CN | 1909793 A | 2/2007 |
| EP | 0 326 740 A1 | 8/1989 |
| JP | 4 252153 | 9/1992 |
| JP | 06 276941 | 10/1994 |
| JP | 7 313063 | 12/1995 |
| JP | 9 505478 | 6/1997 |
| JP | 2000 135059 | 5/2000 |
| JP | 2000 166474 | 6/2000 |
| JP | 2003 319749 | 11/2003 |
| JP | 2004 201629 | 7/2004 |
| JP | 2004-298065 | 10/2004 |
| JP | 2005 40068 | 2/2005 |
| JP | 2006 020526 | 1/2006 |
| JP | 2006-204191 | 8/2006 |
| JP | 2007 282571 | 11/2007 |
| JP | 2010-273674 | 12/2010 |
| WO | WO 2008/078843 A1 | 7/2008 |

OTHER PUBLICATIONS

Japanese Official Notification with Information Offer Form issued Jan. 25, 2012 in patent application No. 2009-288155 with English translation.
Joon-Kwan Moon, et al., "Role of Roasting Conditions in the Profile of Volatile Flavor Chemicals Formed from Coffee Beans", Journal of Agricultural and Food Chemistry, 57, DOI:10.1021/jf901136e, 2009, pp. 5823-5831.
Table 1 (with English translation), 2 pages.
Yuji Oda, "Coffee: The fact and flavor of the production", Hasegawa Letter, T. Hasegawa Co., Ltd., No. 18, 2004, pp. 22-33 (with unedited computer-generated English translation).
Table 2 (with English translation), 2 pages.
R. Silwar, et al., "Gaschromatographisch-massenspektrometrische Untersuchungen des Röst-kaffeearoms—Quantitative Bestimmung wasserdampfflüchtiger Aroma-stoffe," Chem. Mikrobiol. Technol. Lebensm., 10, 1987, pp. 176-187 (with English summary in pp. 176-177).
Table 3 (with English translation), 2 pages.
Table 4 (with English translation), 2 pages.
Japanese Notification with Information Offer Form issued Nov. 15, 2011 in patent application No. 2009-288155 with English translation.
Takashi Ueki, et al., "Quantification of Chlorogenic Acids and Caffeine in Coffee-containing Beverages by High-Performance Liquid Chromatography", Agricultural and Forestry Products Inspection Institute, survey and research report, No. 10, Mar. 1988, pp. 1-14 (with English translation, pp. 1-8).
Watarai, S., et al., "SCC Aroma no Tokucho o Kyoka shita Coffee Koryo no Shokai," Foods & Food Ingredients Journal of Japan, vol. 213, No. 2, pp. 174-178, (Feb. 1, 2008).

(Continued)

Primary Examiner — Anthony Weier
(74) Attorney, Agent, or Firm — Oblon, Spivak, McClelland, Maier & Neustadt, L.L.P.

(57) ABSTRACT

Provided is a concentrated coffee extract solution having a rich sweet aroma and a clear aftertaste. The concentrated coffee extract solution contains the following components (A) and (B):
(A) at least one pyrazine selected from 2-methylpyrazine, 2,5-dimethylpyrazine, 2,6-dimethylpyrazine, ethylpyrazine, 2-ethyl-5-methylpyrazine, 2-ethyl-6-methylpyrazine, 2-ethyl-3-methylpyrazine, 2-ethyl-3,5-dimethylpyrazine and 3,5-dimethyl-2-methylpyrazine, and
(B) at least one guaiacol selected from guaiacol, 4-ethylguaiacol and 4-vinylguaiacol. A content weight ratio [(B)/(A)] of the component (B) to the component (A) is 0.6 or smaller.

13 Claims, No Drawings

(56) References Cited

OTHER PUBLICATIONS

International Search Report Issued Aug. 3, 2010 in PCT/JP10/002869 Filed Apr. 21, 2010.

Combined Chinese Office Action and Search Report issued Oct. 31, 2012 in Chinese Patent Application No. 201080018882.4 (with partial English-language translation and English Translation of Category of Cited Documents).

S. Schenker, et al., "Impact of Roasting Conditions on the Formation of Aroma Compounds in Coffee Beans", Journal of Food Science, vol. 67, No. 1, Jan. 31, 2002, pp. 60-66.

\* cited by examiner

CONCENTRATED COFFEE EXTRACT

CROSS REFERENCE TO RELATED APPLICATION

This application is a 371 of PCT/JP2010/002869, filed on Apr. 21, 2010, and claims priority to the following Japanese Patent Applications: 2009-109211, filed on Apr. 28, 2009; and 2009-288155, filed on Dec. 18, 2009.

FIELD OF THE INVENTION

The present invention relates to a concentrated coffee extract solution.

BACKGROUND OF THE INVENTION

Aroma is an important factor in determining the preference of food and drink, as its tastinessis an overall sensation of both taste and aroma. For example, coffee beverages are favorably and extensively consumed as a luxury grocery item. The flavor of each coffee beverage includes aroma, body, aftertaste and the like, and is characterized by roasted coffee beans used upon production of a coffee extract solution.

The aroma of a coffee extract solution can be classified, from the viewpoint of volatility thereof, into three parts which are a top note, a middle note and a last note. The top note is low in boiling point and high in volatility, and includes aroma components perceivable first. The last note is high in boiling point and low in volatility, and includes components that play a role of a residual aroma. The middle note has intermediate volatility and permanence between the top note and the last note, and includes components that play a central role of the aroma of the coffee extract solution.

As methods for collecting the top note out of these aroma components, it is known, for example, to have aroma components, which have vaporized as a result of heating of ground roasted coffee beans, carried by a carrier gas and to capture them with an organic solvent (Patent Document 1), and also to feed an ethanol-containing aqueous solution and an inert gas into contact with heated, ground roasted coffee beans and to condense and capture the resulting vaporized aroma components (Patent Document 2). As a method for collecting the last note which takes a position opposite to the top note, it has been proposed, for example, to subject a coffee extraction residue, which remains after extraction of coffee, to steam extraction and to recover the distillate (Patent Document 3). As a method for using the top note and the last note, it has also been proposed to blend an aroma solution, which has been obtained by capturing aroma components released upon grinding roasted coffee beans, with a condensed residual-fragrance solution, which has been extracted with an alkaline solution from a coffee extraction residue after extraction of coffee (Patent Document 4). These conventional methods all collect the top note from roasted coffee beans, and make no mention about its collection from a coffee extract solution.

With a view to avoiding reductions in taste and aroma due to a loss of a aroma component upon concentration of a coffee extract solution, on the other hand, a process has been proposed for the production of a concentrated coffee extract solution (Patent Document 5). According to this process, the coffee extract solution is concentrated through a reverse osmosis membrane to separate it into a concentrated solution and a free solution after concentration (permeation solution), the free solution after concentration is evaporated under reduced pressure to obtain from 3 to 25 wt % of a concentrated aroma solution, and the concentrated aroma solution is then mixed with the concentrated solution.

In recent years, as one of approaches for enhancing the preference of coffee beverages, a coffee beverage has been proposed (Patent Document 6). To impart a new flavor (clarity), this coffee beverage makes use of a coffee extract solution which has been brought into contact with a synthetic adsorbent after its treatment with activated carbon.

PRIOR ART DOCUMENTS

Patent Documents

Patent Document 1: JP-A-4-252153
Patent Document 2: JP-A-6-276941
Patent Document 3: JP-A-2000-135059
Patent Document 4: JP-A-2004-201629
Patent Document 5: JP-A-2003-319749
Patent Document 6: JP-A-2007-282571

SUMMARY OF THE INVENTION

The present invention provides a concentrated coffee extract solution containing the following components (A) and (B):

(A) at least one pyrazine selected from 2-methylpyrazine, 2,5-dimethylpyrazine, 2,6-dimethylpyrazine, ethylpyrazine, 2-ethyl-5-methylpyrazine, 2-ethyl-6-methylpyrazine, 2-ethyl-3-methylpyrazine, 2-ethyl-3,5-dimethylpyrazine and 3,5-dimethyl-2-methylpyrazine, and (B) at least one guaiacol selected from guaiacol, 4-ethylguaiacol and 4-vinylguaiacol, wherein a content weight ratio [(B)/(A)] of the component (B) to the component (A) is 0.6 or smaller.

The present invention also provides a soluble coffee which can be obtained by spray-drying or freeze-drying the concentrated coffee extract solution, and also a packaged coffee beverage containing the concentrated coffee extract solution.

The present invention further provides a process for producing a concentrated coffee extract solution, which includes separating a coffee extract solution into a concentrated solution and a fraction by distillation, treating the concentrated solution with a porous adsorbent, and then mixing the concentrated solution, which has been treated with the porous adsorbent, with the fraction.

DESCRIPTION OF THE INVENTION

As is known, a coffee extract solution obtained from roasted coffee beans (arabica coffee from Brazil) has a flavor that has a rich sweet aroma but is insufficient in aftertaste.

With a view to further enhancing the preference of a coffee extract solution obtained from roasted coffee beans (arabica coffee from Brazil), the present inventors treated it by the method described in Patent Document 6 cited above. As a result, it was found that the sweet aroma characteristic to the roasted coffee beans was reduced although the aftertaste thereof was improved. Upon treatment of the coffee extract solution, which had been obtained from the roasted coffee beans (arabica coffee from Brazil), by the process described in Patent Document 5 cited above, on the other hand, it was found that the sweet aroma was enhanced but the aftertaste thereof still remained unimproved.

Under the assumption that the flavor of a coffee extract solution is based on a subtle balance of a top note, a middle note and a last note, the present inventors therefore conducted a study on a coffee extract solution from the viewpoint of flavor. As a result, it was found that the aroma of a coffee extract solution is characterized by a top note and a middle note and that the taste of the coffee extract solution is closely related to a last note. It was then found that a concentrated coffee extract solution having a rich sweet aroma and a clean aftertaste can be obtained by controlling the content weight ratio of the specific aroma components, which are contained in the top note and middle note, to the specific aroma components, which are contained in the last note, to a predetermined range. It is to be noted that the term "aftertaste" as used herein means "a feeling that remains in the mouth" as defined in JIS Z 8144:2004.

According to the present invention, it is possible to provide a concentrated coffee extract solution having a rich sweet aroma and a clear aftertaste. Further, the use of the concentrated coffee extract solution makes it possible to provide a soluble coffee and packaged coffee beverage, both of which have high preference.

(Concentrated Coffee Extract Solution)

The concentrated coffee extract solution according to the present invention contains (A) a pyrazine having a rich sweet aroma and (B) a guaiacol which is a causative substance that deteriorates the aftertaste, and the content of the guaiacol (B) has been significantly lowered. Owing to this feature, the abundance ratio of the pyrazine (A) in the concentrated coffee extract solution according to the present invention has been increased, and as a result, the concentrated coffee extract solution has been enhanced in sweet aroma and has been improved in aftertaste.

The term "the pyrazine (A)" is a concept that embraces 2-methylpyrazine, 2,5-dimethylpyrazine, 2,6-dimethylpyrazine, ethylpyrazine, 2-ethyl-5-methylpyrazine, 2-ethyl-6-methylpyrazine, 2-ethyl-3-methylpyrazine, 2-ethyl-3,5-dimethylpyrazine and 3,5-dimethyl-2-methylpyrazine, and is needed to include at least one of them in the present invention. It is to be noted that the content of the pyrazine (A) in the concentrated coffee extract solution according to the present invention is defined based on the total amount of the above-described nine pyrazines.

Also, the term "the guaiacol (B)" is a concept that encompasses guaiacol, 4-ethylguaiacol and 4-vinylguaiacol, and is needed to include at least one of them in the present invention. It is to be noted that the content of the guaiacol (B) in the concentrated coffee extract solution according to the present invention is defined based on the total amount of the above-described three guaiacols.

The content weight ratio [(B)/(A)] of the component (B) to the component (A) in the concentrated coffee extract solution according to the present invention is 0.6 or smaller. From the viewpoints of enhancing the sweet aroma and improving the aftertaste, the lower the weight ratio [(B)/(A)], the more preferred. Described specifically, the weight ratio [(B)/(A)] may be preferably 0.55 or smaller, more preferably 0.5 or smaller, more preferably 0.45 or smaller, more preferably 0.4 or smaller, even more preferably 0.35 or smaller. It is to be noted that in this specification, a method for the measurement of the content weight ratio [(B)/(A)] of the component (B) to the component (A) shall be based on the "Analysis method of pyrazines and guaiacols" in Examples to be described subsequently herein. The lower limit of the weight ratio [(B)/(A)] is not limited specifically, and may be even 0. From the viewpoint of production efficiency, the weight ratio [(B)/(A)] may be preferably 0.0001 or greater, more preferably 0.001 or greater.

The concentrated coffee extract solution according to the present invention may contain (C) a chlorogenic acid, and from the viewpoints of flavor balance and physiological effects, the content of the chlorogenic acid (C) in the concentrated coffee extract solution according to the present invention may be preferably from 0.01 to 5 wt %, more preferably from 0.02 to 3 wt %, more preferably from 0.03 to 2 wt %, even more preferably from 0.05 to 1.5 wt %. It is to be noted that the term "the chlorogenic acid" is a generic term that collectively encompasses, as monocaffeoylquinic acids, 3-caffeoylquinic acid, 4-caffeoylquinic acid and 5-caffeoylquinic acid; as monoferuloylquinic acids, 3-feruloylquinic acid, 4-feruloylquinic acid and 5-feruloylquinic acid; and as dicaffeoylquinic acids, 3,4-dicaffeoylquinic acid, 3,5-dicaffeoylquinic acid and 4,5-dicaffeoylquinic acid. The content of the chlorogenic acid is defined based on the total amount of the above-described nine chlorogenic acids.

The concentrated coffee extract solution according to the present invention may also contain (D) hydroxyhydroquinone. The content of (D) hydroxyhydroquinone in the concentrated coffee extract solution according to the present invention may be preferably lower than 0.1 wt %, more preferably lower than 0.08 wt %, more preferably lower than 0.06 wt %, even more preferably lower than 0.04 wt % based on the content of the chlorogenic acid, from the viewpoints of flavor balance and physiological effects. On the other hand, its lower limit is not limited specifically and may be even 0 wt %.

As a form of the concentrated coffee extract solution according to the present invention, it may include various forms such as an aqueous solution, solid (e.g., dried product), liquid and slurry (e.g., concentrate), and may be chosen as desired.

(Production Process of Concentrated Coffee Extract Solution)

A description will next be made about a process for the production of the concentrated coffee extract solution according to the present invention.

First, a coffee extract solution to be used as a raw material is provided.

The coffee extract solution may be extracted from roasted coffee beans, or be prepared from an aqueous solution or the like of an instant coffee. The coffee extract solution for use in the present invention may be one obtained by using preferably 1 g or more, more preferably 2.5 g or more, even more preferably 5 g or more of coffee beans in terms of green beans per 100 g of the coffee extract solution.

As a species of the coffee beans for use in the present invention, *Arabica* species, *Robusta* species and the like may be exemplified. As varieties of coffee beans, it may include Brazil, Colombia, Tanzania, Mocha, Kilimanjaro, Mandarin, Blue Mountain and the like. These coffee beans may be used as a single variety, or plural varieties may be used as a blend. Among these, arabica coffee from Brazil is preferred as coffee beans from the viewpoint of flavor balance.

As a method for roasting the coffee beans, it is possible to suitably choose a known method such as, for example, the direct-fired method, the hot-air method, or the half-hot-air method. It is preferred to include a rotary drum in such a roasting method. The roasting temperature is not specifically limited, and it may be preferably from 100 to 300° C., more preferably from 150 to 250° C. From the viewpoint of taste and aroma, the roasted coffee beans may be cooled preferably to from 0 to 100° C., more preferably from 10 to 60° C. within one hour after the roasting.

Concerning the degree of roast of roasted coffee beans, light, cinnamon, medium, high, city, full-city, French and Italian may be exemplified. Of these, preferred is light, cinnamon, medium, high, and city.

The L value available from the measurement of the degree of roast by a color difference meter may be preferably from 10 to 35, more preferably from 15 to 25, even more preferably from 16 to 25. It is to be noted that in the present invention, coffee beans having different degrees of roast may be mixed or may be used after grinding.

No particular limitation is imposed on the manner of extraction from roasted coffee beans, and as an illustrative manner, extraction may be conducted for from 10 seconds to 30 minutes from the roasted coffee beans or coffee grounds thereof with an extraction solvent such as cold water to hot water (0 to 100° C.). Concerning the fineness of grind, extra-fine grind (0.250 to 0.500 mm), fine grind (0.300 to 0.650 mm), medium-fine grind (0.530 to 1.000 mm), medium grind (0.650 to 1.500 mm), medium-coarse grind, coarse grind (0.850 to 2.100 mm), and extra-coarse grind (1.000 to 2.500 mm) may be mentioned, or cut coffees of approx. 3 mm, 5 mm or 10 mm in average cut size may be mentioned. As extraction methods, boiling, espresso, siphon, drip (with paper, flannel or the like), and the like may be mentioned.

The extraction solvent may be water, alcohol-containing water, milk, carbonated water or the like. The pH (25° C.) of the extraction solvent may be generally from 4 to 10, with from 5 to 7 being preferred from the viewpoint of taste and aroma. A pH regulator, for example, sodium bicarbonate, sodium hydrogencarbonate, L-ascorbic acid or sodium L-ascorbate may be incorporated in the extraction solvent to adjust its pH as desired.

No particular limitation is imposed on an extractor. Illustrative are a heated pot, a stirrer-equipped pot and stirred pot, a bag-shaped structure made of paper or nonwoven fabric and suspendable practically into a coffee cup, a drip brewer equipped in an upper part thereof with a spray nozzle and in a lower part thereof with a structure (a mesh or punched metal and the like) capable of practically performing a solid-liquid separation of coffee beans, and a column extractor equipped in upper and lower parts thereof with structures (meshes or punched metals and the like) capable of practically performing a solid-liquid separation of coffee beans, and the like. These extractors and brewer may be equipped with a structure that permits heating or cooling (for example, an electric heater, or a jacket through which hot water, steam or cold water can be passed).

As extraction processes, batchwise extraction process, semi-batchwise extraction and continuous extraction may be mentioned. The extraction time of the batchwise extraction or semi-batchwise extraction may be preferably from 10 seconds to 120 minutes, more preferably from 30 seconds to 40 minutes from the viewpoint of taste and aroma.

In the present invention, the coffee extract solution obtained by extraction from the roasted coffee beans may be used as it is. The solids content of the coffee extract solution may be preferably from 1 to 10%, more preferably from 2 to 7%, even more preferably 3% or higher but lower than 5%. The term "solids content" as used herein means one measured by the "Measurement method of Brix degree" in Example to be described subsequently herein.

The coffee extract solution is next distilled. By the distillation, the coffee extract solution is separated into a fraction and a concentrated solution. The fraction contains a portion of the middle note and the top note, while the concentrated solution contains a portion of the middle note and the last note. For example, effective aroma components such as the pyrazine (A) are recovered in the fraction, while unnecessary components such as the guaiacol (B) are recovered in the concentrated solution.

To distil the coffee extract solution, distillation may be conducted by a known method and equipment, and no particular limitation is imposed on the distillation method or equipment.

From the viewpoints of the capture of aroma components, separation rate and the like, the distillation may desirably be conducted under a reduced pressure of preferably from 5 to 100 kPa, more preferably from 10 to 50 kPa, more preferably from 10 to 40 kPa, even more preferably from 10 to 30 kPa in absolute pressure.

As a temperature condition for the distillation, the distillation temperature may be preferably 20° C. or higher, more preferably 30° C. or higher, more preferably 35° C. or higher, more preferably 40° C. or higher, even more preferably 55° C. or higher from the viewpoints of the capture of aroma components and the assurance of an evaporation rate. From the viewpoint of the quality maintenance of the concentrated coffee extract solution, on the other hand, the distillation temperature may be preferably 100° C. or lower, more preferably 80° C. or lower, even more preferably 70° C. or lower.

From the viewpoint of having unnecessary components such as the guaiacol (B) and hydroxyhydroquinone efficiently adsorbed on a porous adsorbent and allowing aroma components to move sufficiently into a fraction while suppressing the adsorption of the aroma components, the weight ratio of the fraction to the coffee extract solution may be preferably from 0.3 to 0.9, more preferably from 0.4 to 0.85, even more preferably from 0.5 to 0.8.

The concentrated solution separated as described above is next treated with the porous adsorbent. By this treatment, the unnecessary components such as the guaiacol (B) and hydroxyhydroquinone contained in the last note can be eliminated.

As the kind of the porous adsorbent for use in the present invention, it is possible to use one of the carbonaceous adsorbents, silica/alumina-based adsorbents, polymer adsorbents, chitosan resins and the like, which are described in "Adsorption Technology Handbook—Process, Material, Design" in Japanese (Published on Jan. 11, 1999 by NTS Inc., Editor: Y. TAKEUCHI). Among these, the carbonaceous adsorbents are preferred from the viewpoint of efficient elimination of unnecessary substances.

Of the carbonaceous adsorbents, powdery activated carbon, granular activated carbon and activated carbon fibers are preferred from the viewpoint of efficient elimination of unnecessary substances.

Source materials for powdery and granular activated carbons include saw dust, coal, palm shells, and the like. Preferred is the palm shell activated carbon derived from palm shells, with activated carbon activated with a gas such as steam being more preferred. As commercial products of such steam-activated, activated carbon, "SHIRASAGI WH2c" (Japan EnviroChemicals, Ltd.), "TAIKO CW" (Futamura Chemical Industries Co., Ltd.), "KURARAY COAL GL" (Kuraray Chemical Co., Ltd.) and the like may be used.

The amount of the porous adsorbent to be used may be preferably from 0.1 to 2 weight times, more preferably from 0.2 to 1 weight times, more preferably from 0.3 to 0.8 weight times, even more preferably from 0.4 to 0.7 weight times relative to the solids content of the concentrated solution, from the viewpoint of efficient elimination of unnecessary components.

A contact treatment method may be a batch method or a column pass-through method.

As the batch method, the porous adsorbent may be added to the concentrated solution and after stirring it at from −10 to 100° C. for from 0.5 minute to 5 hours, the adsorbent may be removed. An atmosphere at the time of the treatment may be air or an inert gas (nitrogen gas, argon gas, helium gas, or carbon dioxide), with an inert gas being preferred from the viewpoint of taste and aroma.

As the column pass-through method, the adsorbent may be packed in an adsorption column, and the concentrated solution may be charged from a lower part or upper part of the column and discharged from the opposite part. The ratio L/D of the pack height L to D (diameter) for the adsorbent may preferably be from 0.1 to 10. The amount of the adsorbent to be packed in the column may be such that the adsorbent can be packed in the adsorption column before pass-through. The adsorption column is preferably equipped, in at least one of its upper stage and lower stage, with a separation structure that can substantially prevent the adsorbent from flowing out, such as a mesh (screen) or punched metal. No particular limitation is imposed on the opening size of the separation structure, insofar as it is smaller than the average particle size of the adsorbent. The separation structure may have apertures of preferably ½ or smaller, more preferably ⅓ or smaller of the average particle size of the adsorbent. The specific opening size may preferably be from 0.1 to 1,000 μm.

The adsorption treatment temperature of the concentrated solution may be preferably from −10° C. to 100° C., more preferably from 0 to 40° C. from the viewpoint of taste and aroma. The residence time (K/QC) of the flow quantity (QC [g/min]) of the concentrated solution relative to the amount (K[g]) of the adsorbent in the adsorption column may preferably be from 0.5 to 300 minutes.

The concentrated solution treated with the porous adsorbent and the fraction are next mixed together. Upon conducting this mixing, the mixing ratio of the concentrated solution treated with the porous adsorbent to the fraction is adjusted such that the weight ratio [(B)/(A)] falls within the above-described range. The fraction may be used as it is, or may be concentrated or diluted as needed.

In the fraction, effective aroma components such as the pyrazine (A) are abundantly contained, while the guaiacol (B) which is a causative substance that deteriorates the aftertaste is not contained practically. Owing to the treatment with the porous adsorbent, the content of the guaiacol (B) has been lowered significantly in the concentrated solution treated with the porous adsorbent. By mixing the concentrated solution, which has been treated with the porous adsorbent, with the fraction such that the weight ratio [(B)/(A)] falls within the above-described range, a concentrated coffee extract solution can be obtained with a rich sweet aroma and clean aftertaste.

(Soluble Coffee, Packaged Coffee Beverage)

The concentrated coffee extract solution according to the present invention is suited for the production of a soluble coffee and packaged coffee beverage.

The soluble coffee according to the present invention can be obtained by drying the concentrated coffee extract solution. As a drying method, spray drying, freeze drying or the like may be exemplified. As a form of the soluble coffee, a powder, granules, tablets or the like may be exemplified.

Also, the packaged coffee beverage according to the present invention can be produced by filling the concentrated coffee extract solution, as it is, in a package or by filling it in a package after concentration or dilution as needed.

In the packaged coffee beverage according to the present invention, one or more of additives may be added as needed. These additives may include bitterness suppressors, antioxidants, flavor, various esters, organic acids, organic acid salts, inorganic acids, inorganic acid salts, inorganic salts, colorants, emulsifiers, preservatives, seasoning agents, sour seasonings, quality stabilizers, and so on. The packaged coffee beverage according to the present invention may be produced as a packaged black coffee beverage or a packaged milk coffee beverage.

The packaged coffee beverage according to the present invention may preferably contain the chlorogenic acid (C) at preferably from 0.01 to 1 wt %, more preferably from 0.05 to 0.5 wt %, even more preferably from 0.1 to 0.3 wt %.

Also, in the soluble coffee according to the present invention, the lower limit of the chlorogenic acid (C) may be preferably 5 wt % or higher, more preferably 8 wt % or higher, more preferably 10 wt % or higher, even more preferably 12 wt % or higher, while its upper limit may be preferably 25 wt % or lower, more preferably 20 wt % or lower, more preferably 18 wt % or lower, even more preferably 16 wt % or lower.

In the soluble coffee and packaged coffee beverage according to the present invention, the content of hydroxyhydroquinone (D) may be preferably less than 0.1 wt %, more preferably less than 0.05 wt %, more preferably less than 0.03 wt %, even more preferably less than 0.01 wt % based on the content of the chlorogenic acid, while the lower limit is not particularly limited and may be even 0 wt %.

The packaged coffee beverage according to the present invention can be provided in a conventional package such as a molded package made of polyethylene terephthalate as a principal component (a so-called PET bottle), a metal can, a paper package combined with metal foils or plastic films, a bottle or the like.

The packaged beverage can be produced, for example, by filling the beverage in a package like a metal can and after that, when heat sterilization is feasible, conducting the heat sterilization under sterilization conditions prescribed in relevant regulations (in Japan, the Food Sanitation Act). For those which cannot be subjected to retort sterilization like PET bottles or paper packages, a process may be adopted such that the beverage is sterilized beforehand at a high temperature for a short time under similar sterilization conditions as those described above, for example, by a plate-type heat exchanger or the like, is cooled to a particular temperature, and is then filled in a package.

EXAMPLES (Analysis of Chlorogenic Acids)

An analysis method of chlorogenic acids was as will be described hereinafter. HPLC was used as an analyzer.

The followings are the model numbers of component units in the analyzer.

UV-VIS detector: "L-2420" (Hitachi High-Technologies Corporation)

Column oven: "L-2300" (Hitachi High-Technologies Corporation)

Pump: "L-2130" (Hitachi High-Technologies Corporation)

Autosampler: "L-2200" (Hitachi High-Technologies Corporation)

Column: "CADENZA CD-C18", 4.6 mm inner diameter× 150 mm length, particle size: 3 μm (IntactCorp.)

Analytical conditions were as follows.

Sample injection volume: 10 μL

Flow rate: 1.0 mL/min

Wavelength preset for UV-VIS detector: 325 nm
Preset column-oven temperature: 35° C.
Eluent A: 5 (V/V) % acetonitrile solution containing 0.05 M of acetic acid, 0.1 mM 1-hydroxyethane-1,1-diphosphonic acid and 10 mM sodium acetate
Eluent B: acetonitrile
Concentration Gradient Conditions

| Time | Eluent A | Eluent B |
|---|---|---|
| 0.0 min | 100% | 0% |
| 10.0 min | 100% | 0% |
| 15.0 min | 95% | 5% |
| 20.0 min | 95% | 5% |
| 22.0 min | 92% | 8% |
| 50.0 min | 92% | 8% |
| 52.0 min | 10% | 90% |
| 60.0 min | 10% | 90% |
| 60.1 min | 100% | 0% |
| 70.0 min | 100% | 0% |

In HPLC, a sample (1 g) was accurately weighed, its total volume was increased to 10 mL with Eluent A, and subsequent to filtration through a membrane filter ("GL CHROMATODISK 25A", pore size: 0.45 μm, GL Science, Inc.), the filtrate was provided for an analysis.

Retention time (unit: min) of chlorogenic acids, i.e., nine chlorogenic acids:

($C^1$) Monocaffeoylquinic acids: 3 kinds at 5.3, 8.8 and 11.6 in total ($C^2$) Feruloylquinic acids: 3 kinds at 13.0, 19.9 and 21.0 in total ($C^3$) Dicaffeoylquinic acids: 3 kinds at 36.6, 37.4 and 44.2 in total From the area values of the nine chlorogenic acids as determined above, the wt % of the chlorogenic acids was determined by using 5-caffeoylquinic acid as a standard substance.

(Analysis of Hydroxyhydroquinone)

An analytical method of hydroxyhydroquinone was as will be described hereinafter.

As an analyzer, an HPLC-electrochemical detector (the coulometric type) "COULARRAY SYSTEM" (model: 5600A, developed and manufactured by: ESA Analytical, Ltd., U.S.A., imported and sold by: MC Medical, Inc.) was used.

The followings are the names and model numbers of component units in the analyzer.

Analytical cell: "MODEL 5010", coularray organizer, coularray electronics module,
Software: "MODEL 5600A"
Solvent feeder module: "MODEL582", gradient mixer
Autosampler: "MODEL 542", pulse damper
Degasser: "DEGASYS ULTIMATE DU3003"
Column oven: "505"
Column: "CAPCELL PAK C18 AQ", 4.6 mm inner diameter×250 mm length, particle size: 5 μm (Shiseido Co., Ltd.)
Analytical conditions were as follows.
Sample injection volume: 10 μL
Flow rate: 1.0 mL/min
Voltage applied to electrochemical detector: 0 mV,
Preset column-oven temperature: 40° C.
Eluent C: 5 (V/V) % methanol solution containing 0.1 (W/V) % phosphoric acid and 0.1 mM 1-hydroxyethane-1,1-diphosphonic acid
Eluent D: 50 (V/V) % methanol solution containing 0.1 (W/V) % phosphoric acid and 0.1 mM 1-hydroxyethane-1,1-diphosphonic acid For the preparation of Eluents C and D, distilled water for high-performance liquid chromatography (Kanto Chemical Co., Ltd.), methanol for high-performance liquid chromatography (Kanto Chemical Co., Ltd.), phosphoric acid (guaranteed reagent, Wako Pure Chemical Industries, Ltd.) and 1-hydroxyethane-1,1-diphosphonic acid (60% aqueous solution, Tokyo Kasei Kogyo Co., Ltd.) were used.

Concentration Gradient Conditions

| Time | Eluent C | Eluent D |
|---|---|---|
| 0.0 min | 100% | 0% |
| 10.0 min | 100% | 0% |
| 10.1 min | 0% | 100% |
| 20.0 min | 0% | 100% |
| 20.1 min | 100% | 0% |
| 50.0 min | 100% | 0% |

For the preparation of each analysis sample, a sample (5 g) was accurately weighed, its total volume was increased to 10 mL with a 5 (V/V) % methanol solution containing 0.5 (W/V) % phosphoric acid and 0.5 mM 1-hydroxyethane-1,1-diphosphonic acid. The solution was subjected to a centrifugation to obtain a supernatant. The supernatant was allowed to pass through "BOND ELUTE SCX" (packed weight of solid phase: 500 mg, reservoir capacity: 3 mL, GL Science, Inc.), and an initial volume (approx. 0.5 mL) of passed solution was diverted to obtain a passed solution. The passed solution was subjected to filtration through a membrane filter ("GL CHROMATODISK 25A", pore size: 0.45 μm, GL Science, Inc.), and the filtrate was promptly provided for its analysis.

In the analysis by the HPLC-electrochemical detector under the above-described conditions, the retention time of hydroxyhydroquinone was 6.38 minutes. From the area value of the resulting peak, its % by weight was determined by using hydroxyhydroquinone (Wako Pure Chemical Industries, Ltd.) as a standard substance.

(Analyses of Pyrazines and Guaiacols)

A sample (2 g) was sampled in a vial. Aroma components in a headspace were adsorbed by an SPME fiber and were provided for GC/MS measurement. From the area values of the pyrazines and guaiacols, the weight ratio {(B)/(A)} was determined.

Analytical conditions were as follows.
HS-GC/MS Conditions
Measurement instrument: "HP6890" (manufactured by Agilent Technologies, Inc.)
Column: "BC-WAX", 0.25 mm inner diameter×50 mm length, particle size: 0.25 μm (GL Science, Inc.)
Temperature program: 60° C. (5 min)→230° C., heated at 5° C./min
Head pressure: 14.8 psi
Inlet temperature: 210° C.
Detector temperature: 200° C.
Split ratio: 30:1
Carrier gas: helium
Scan mode: Ionization voltage 70 eV
(Measurement of Brix Degree)

It was indicated as a sugar refractometer index (Brix degree) at 20° C. The measurement was conducted by "ATAGO RX-5000" (manufactured by Atago Co., Ltd.).

(Sensory Evaluation)

Each packaged coffee beverage was tested by a panel of five experts, and with respect to (i) sweet aroma and (ii) aftertaste, evaluations were made in accordance with the following standards. Subsequently, final scores were determined upon deliberation.

(i) Evaluation Standards for Sweet Aroma
- A: A sweet aroma is strong.
- B: A sweet aroma is a little strong.
- C: A sweet aroma is a little weak.
- D: A sweet aroma is weak.

(ii) Evaluation Standards for Aftertaste
- A: Clear.
- B: A little clear.
- C: A little dull.
- D: Dull.

Example 1

(Preparation of Coffee Extract Solution)

Roasted coffee beans (arabica coffee from Brazil, a 58/42 blend of coffee beans roasted to L34/L16.5 degrees of roast, 400 g) were extracted with hot water of 93° C. to obtain a coffee extract solution (2,400 g).

The analytical values of respective components in the resultant coffee extract solution were as follows.
- Brix degree (%): 4.76
- Chlorogenic acids (CGA) (mg/100 g): 437.9
- Hydroxyhydroquinone (HHQ) (mg/kg): 22.12

(Distillation of Coffee Extract Solution)

The coffee extract solution (2,318 g, solids content: 4.75%) was concentrated at 60° C. under a reduced pressure of 18.7 kPa, and a fraction was condensed at a solution temperature of 8° C. to obtain 32.2 wt % of a concentrated solution (solids content: 14.28%) and 67.8 wt % of a fraction (solids content: 0.22%).

(Treatment of Concentrated Solution with Activated Carbon)

Only the concentrated solution was treated at 25° C. with activated carbon ("SHIRASAGIWH2C42/80LSS", Japan EnviroChemicals, Ltd.). The amount of the activated carbon to be used was set at 0.5 weight times relative to the solids content of the concentrated solution.

(Mixing of Concentrated Solution Treated with Activated Carbon, with Fraction)

The resultant, concentrated solution treated with activated carbon (732 g, solids content: 10.9%) and the fraction (1,570 g, solids content: 0.22%) were mixed in their entirety to obtain a concentrated coffee extract solution.

(Packaged Coffee Beverage)

The resultant, concentrated coffee extract solution was diluted and adjusted with deionized water to a Brix degree of 1.85. After being filled in a can package, heat sterilization was conducted at 134° C. for 90 seconds to obtain a packaged coffee beverage. The resultant, packaged coffee beverage was then subjected to a componential analysis and a sensory test. The production conditions for the concentrated coffee extract solution are shown in Table 1, and the results of the componential analysis and sensory test are presented in Table 2.

Example 2

A packaged coffee beverage was obtained in a similar manner as in Example 1, except that the distillation of the coffee extract solution was conducted at 50° C. under a reduced pressure of 34.7 kPa and 54.8 wt % of the concentrated solution and 45.2 wt % of the fraction were used. The resultant, packaged coffee beverage was then subjected to a componential analysis and a sensory test. The production conditions for the concentrated coffee extract solution are shown in Table 1, and the results of the componential analysis and sensory test are presented in Table 2.

Example 3

A packaged coffee beverage was obtained in a similar manner as in Example 1, except that in the treatment of the concentrated solution with the activated carbon, the amount of the activated carbon to be used was changed to 0.25 weight times relative to the solids content of the concentrated solution. The resultant, packaged coffee beverage was then subjected to a componential analysis and a sensory test. The production conditions for the concentrated coffee extract solution are shown in Table 1, and the results of the componential analysis and sensory test are presented in Table 2.

Comparative Example 1

A packaged coffee beverage was obtained in a similar manner as in Example 1, except that the treatment with activated carbon was not conducted on the concentrated solution. The resultant, packaged coffee beverage was then subjected to a componential analysis and a sensory test. The production conditions for the concentrated coffee extract solution are shown in Table 1, and the results of the componential analysis and sensory test are presented in Table 2.

Comparative Example 2

A packaged coffee beverage was obtained in a similar manner as in Example 1, except that the coffee extract solution was subjected to treatment with activated carbon as it is without distillation. The resultant, packaged coffee beverage was then subjected to a componential analysis and a sensory test. The production conditions for the coffee extract solution are shown in Table 1, and the results of the componential analysis and sensory test are presented in Table 2.

Comparative Example 3

Roasted coffee beans (arabica coffee from Brazil, a 58/42 blend of coffee beans roasted to L34/L16.5 degrees of roast, 400 g) were extracted with hot water of 93° C. to obtain a coffee extract solution (2,400 g). The coffee extract solution was diluted and adjusted with deionized water to a Brix degree of 1.85. After being filled in a can package, heat sterilization was conducted at 134° C. for 90 seconds to obtain a packaged coffee beverage. The resultant, packaged coffee beverage was then subjected to a componential analysis and a sensory test. The production conditions for the concentrated coffee extract solution are shown in Table 1, and the results of the componential analysis and sensory test are presented in Table 2.

TABLE 1

Production Conditions for Concentrated Coffee Extract Solutions

|  | Example | | | Comparative Example | | |
| --- | --- | --- | --- | --- | --- | --- |
|  | 1 | 2 | 3 | 1 | 2 | 3 |
| <Concentration> | | | | | | |
| Temperature (° C.) | 60 | 50 | 60 | 60 | — | — |
| Pressure (kPa) | 18.7 | 34.7 | 18.7 | 18.7 | — | — |
| Fraction/coffee extract solution (wt %) | 67.8 | 45.2 | 67.8 | 67.8 | — | — |
| Concentrated solution/coffee extract solution (wt %) | 32.2 | 54.8 | 32.2 | 32.2 | — | — |
| Brix degree of concentrated solution (%) | 14.3 | 8.7 | 14.3 | 14.3 | — | — |
| Treatment with activated carbon | Treated | Treated | Treated | Not treated | Treated | Not treated |
| Amount of activated carbon to be used (relative to the solids content of concentrated solution) | 0.5 | 0.5 | 0.25 | — | 0.5 | — |
| <Recovery of fraction> | | | | | | |
| Recovery of fraction | Recovered | Recovered | Recovered | Recovered | Not recovered | Not recovered |
| Brix degree after recovery of fraction and dilution (%) | 1.85 | 1.84 | 1.85 | 1.85 | 1.85 | 1.85 |

TABLE 2

Componential Analysis and Sensory Evaluation of Concentrated Coffee Extract Solutions

|  | Example | | | Comparative Example | | |
| --- | --- | --- | --- | --- | --- | --- |
|  | 1 | 2 | 3 | 1 | 2 | 3 |
| (A) Pyrazines (Area × $10^7$) | | | | | | |
| 2-Methylpyrazine | 0.99 | 0.46 | 0.90 | 0.75 | 0.09 | 1.07 |
| 2,5-Dimethylpyrazine | 0.64 | 0.24 | 0.55 | 0.55 | 0.05 | 0.73 |
| 2,6-Dimethylpyrazine | 0.55 | 0.33 | 0.49 | 0.51 | 0.07 | 0.69 |
| Ethylpyrazine | 0.45 | 0.24 | 0.37 | 0.34 | 0.05 | 0.46 |
| 2-Ethyl-5-methylpyrazine | 0.70 | 0.41 | 0.57 | 0.59 | 0.08 | 0.81 |
| 2-Ethyl-6-methylpyrazine | 0.58 | 0.34 | 0.48 | 0.49 | 0.07 | 0.63 |
| 2-Ethyl-3-methylpyrazine | 0.49 | 0.30 | 0.43 | 0.50 | 0.06 | 0.64 |
| 2-Ethyl-3,5-dimethylpyrazine | 0.98 | 0.60 | 1.02 | 1.13 | 0.12 | 1.42 |
| 3,5-Dimethyl-2-methylpyrazine | 0.31 | 0.15 | 0.25 | 0.26 | 0.03 | 0.40 |
| Total (Areas × $10^7$) | 5.69 | 3.07 | 5.06 | 5.12 | 0.62 | 6.85 |
| (B) Guaiacols (Area × $10^7$) | | | | | | |
| Guaiacol | 0.39 | 0.26 | 0.34 | 0.42 | 0.08 | 0.55 |
| 4-Ethylguaiacol | 0.66 | 0.40 | 0.60 | 0.90 | 0.18 | 1.07 |
| 4-Vinylguaiacol | 0.78 | 0.51 | 0.97 | 2.34 | 0.47 | 2.94 |
| Total (Areas × $10^7$) | 1.83 | 1.17 | 1.91 | 3.66 | 0.73 | 4.56 |
| Weight ratio (B)/(A) | 0.32 | 0.38 | 0.38 | 0.71 | 1.18 | 0.67 |
| (C) Chlorogenic acids (wt %) | 0.19 | 0.19 | 0.18 | 0.17 | 0.18 | 0.17 |
| (D) Hydroxyhydroquinone (wt %) | 0.000032 | 0.000033 | 0.000040 | 0.00086 | 0.000040 | 0.00086 |
| Sensory evaluation | | | | | | |
| Sweet aroma | A | B | A | A | D | B |
| Aftertaste | A | A | B | D | A | D |

From Table 2, it has found that a packaged coffee beverage having a rich sweet aroma and clear aftertaste can be obtained by adding a concentrated coffee extract solution in which the content weight ratio [(B)/(A)] of (B) a guaiacol to (A) a pyrazine has been controlled to a predetermined range.

The invention claimed is:

1. A concentrated coffee extract solution comprising the following components (A) and (B):
   (A) a pyrazine comprising 2-methylpyrazine, 2,5-dimethylpyrazine, 2,6-dimethylpyrazine, ethylpyrazine, 2-ethyl-5-methylpyrazine, 2-ethyl-6-methylpyrazine, 2-ethyl-3-methylpyrazine, 2-ethyl-3,5-dimethylpyrazine and 3,5-dimethyl-2-methylpyrazine, and
   (B) a guaiacol comprising guaiacol, 4-ethylguaiacol and 4-vinylguaiacol,
   wherein a content weight ratio [(B)/(A)] of the component (B) to the component (A) is 0.6 or smaller.

2. The concentrated coffee extract solution according to claim 1, wherein the concentrated coffee extract solution comprises a chlorogenic acid as a component (C), and a content of the component (C) in the concentrated coffee extract solution is from 0.01 to 5 wt %.

3. The concentrated coffee extract solution according to claim 2, wherein the concentrated coffee extract solution comprises hydroxyhydroquinone as a component (D), and a content of the component hydroxyhydroquinone in the concentrated coffee extract solution is less than 0.1 wt % relative to a content of a chlorogenic acid.

4. A packaged coffee beverage comprising the concentrated coffee extract solution according to claim 1.

5. The concentrated coffee extract solution according to claim 1, wherein [(B)/(A)] is 0.45 or smaller.

6. The concentrated coffee extract solution according to claim 1, wherein [(B)/(A)] is 0.4 or smaller.

7. The concentrated coffee extract solution according to claim 1, wherein [(B)/(A)] is 0.35 or smaller.

8. The concentrated coffee extract solution according to claim 2, wherein the content of the component (C) is from 0.02 to 3 wt %.

9. The concentrated coffee extract solution according to claim 2, wherein the content of the component (C) is from 0.03 to 2 wt %.

10. The concentrated coffee extract solution according to claim 2, wherein the content of the component (C) is from 0.05 to 1.5 wt %.

11. The concentrated coffee extract solution according to claim 3, wherein the content of the component hydroxyhydroquinone in the concentrated coffee extract solution is less than 0.08 wt % relative to a content of a chlorogenic acid.

12. The concentrated coffee extract solution according to claim 3, wherein the content of the component hydroxyhydroquinone in the concentrated coffee extract solution is less than 0.06 wt % relative to a content of a chlorogenic acid.

13. The concentrated coffee extract solution according to claim 3, wherein the content of the component hydroxyhydroquinone in the concentrated coffee extract solution is less than 0.04 wt % relative to a content of a chlorogenic acid.

* * * * *